Patented Nov. 4, 1941

2,261,691

UNITED STATES PATENT OFFICE 2,261,691

TREATMENT OF GLASS CONTAINERS TO IMPROVE THEIR CHEMICAL DURABILITY

Aaron K. Lyle and Donald E. Sharp, West Hartford, Conn., assignors to Hartford-Empire Company, Hartford, Conn., a corporation of Delaware No Drawing. Original application December 16, 1939, Serial No. 309,612. Divided and this application October 14, 1940, Serial No. 361,112

3 Claims. (Cl. 49—77)

The present invention relates to the treatment of glass containers, such as bottles or jars, to improve the chemical durability of the interior surface thereof.

It has been found that glass containers, particularly those used for aqueous liquid or semi-liquid materials, are subject to a certain amount of attack of the interior surfaces or that the material adhering to or formed in or on these surfaces are attacked by the aqueous contents of such containers. This has sometimes resulted in undesirably affecting the flavor or taste of the contents and also the appearance of the containers. One explanation of this difficulty is that it is due to the presence on the interior surfaces of such containers of a certain amount of alkali, which may subsequently be dissolved off or leached out by the contents of the container. Sometimes this has further resulted in the presence within the container, and within the contents, of flaky material, which is either silica or of a silicious nature and which gives the appearance of a sediment in a transparent liquid material such as may be contained within the container, as for example certain beverage liquids.

These difficulties have given rise to various attempts to improve the chemical durability of the interiors of such containers, for which patents have been granted both in this and foreign countries. The prior art has in practically all cases employed acidic materials, or materials which upon reaction, for example burning, produced acidic materials calculated to react with and neutralize the alkali in the surface of the glass. Certain of these materials, for example sulphur and the oxidation products thereof, are objectionable in use, not only due to the undesirable odors produced by freeing sulphur oxides within a glass factory, but also by reason of the corrosive action of these gases in respect to the apparatus used in the glass factory, particularly that used in annealing the containers, which annealing is usually done at the same time as or subsequent to the treatment of the interior surfaces thereof.

An object of the present invention comprises the treatment of glass containers to increase the chemical durability of the interior surfaces thereof by one or more of various liquid materials, which are organic chemicals, and which are substantially neutral in character as compared with the acidic materials disclosed by the prior art. These materials are largely free from the objections incident to the use of sulphur oxides, in that the products resulting from the use thereof are substantially less corrosive. Furthermore, they can be used in sufficiently small quantities, in the order of magnitude of 0.2 cc. per pint of contents of the container treated, so that the additional cost incident to the treating of glass containers in accordance with the present invention is amply warranted and does not unduly increase the cost of the treated glass containers in respect to untreated containers.

Various theories have been advanced to explain the action of different materials in treating glass articles in accordance with the prior art, certain of which may possibly have a bearing upon the materials disclosed herein. One such theory is that the materials are themselves of an acidic nature (the prior art) or may by decomposition and/or combustion produce materials which are of an acidic nature, for example the carbon of organic material burning to carbon dioxide, which combines with water vapor from the water incident to the combustion of hydrogen of organic materials or that in the air to form carbonic acid. In all such cases, the theory is a simple neutralization of the alkali present in the surface of the glass by the acidic vapor in contact therewith.

Another theory which may tend to explain the results obtained is that certain gaseous products, resulting from the vaporization and/or decomposition of the materials used, are adsorbed on the surface of the glass in such a way as to prevent the subsequent solution of the alkali from the surface by any washing processes used and subsequently by the aqueous contents later placed in the containers.

Whatever may be the correct theory, however, it has been proven by actual test that glass containers treated in accordance with this invention, and subsequently washed with water and dried, have a substantially smaller amount of alkali on the surface which can be extracted by prolonged heating with water under pressure in an autoclave. In this test untreated bottles filled with water were placed in an autoclave and subjected to predetermined temperature and pressure conditions. The alkalinity of the water in the bottles was subsequently determined. Bottles treated with various materials were placed in the autoclave with water and given the same predetermined temperature and pressure treatments. The alkalinity of the water in the bottles was subsequently determined. The results show very substantial decreases in the alkalinity of the water for containers treated in accordance with the present invention. In some instances, the water showed no alkalinity at all, which could be determined by quantitative methods. Inasmuch as this test has been found to be a measure of the chemical durability of glass containers in actual use, it has been employed in ascertaining the effectiveness of different types of materials.

The present invention is directed to treating glass articles as aforesaid with acetone

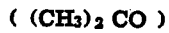
$( (CH_3)_2 CO )$

The present case is a division of applicants' prior and copending application, Serial No. 309,612, filed Dec. 16, 1939, for "Treatment of glass containers to improve their chemical durability." Another division of the same parent application, directed to treating glass articles with single ring type, aromatic hydrocarbons, is being filed concurrently herewith.

The normal manner of employing the treated material is to drop into the interior of the article a small amount of the liquid treating material, preferably about 0.2 cc. per pint of contents of the container to be treated for the material herein disclosed. This operation may be effected by hand, or by any suitable automatic means, the details of which form no part of the present invention.

The treating material may be introduced while the container is hot, i. e., at a temperature over 300° C., and before or during the ordinary annealing of the container or, if the container is to be tempered, before or after the tempering operation. Also in certain instances, and with certain of the above-mentioned treating materials, satisfactory results can be obtained by introducing the treating material into the interior of the container in any desired manner as aforesaid, while the container is relatively cold, i. e., under 300° C., and thereafter heating the container to a temperature above 300° C., such for example as is normally done in reannealing a container after a decoration has been applied to the outside thereof.

We do not wish to be limited, therefore, except by the scope of the appended claims, which are to be construed as broadly as the state of the prior art permits.

We claim:

1. The method of treating a hollow glass article to improve the chemical durability of the interior surface thereof, comprising treating the article with a small amount of acetone while the article is at a temperature of more than 300° C.

2. The method according to claim 1, wherein the acetone is introduced into the article while the latter is at a temperature of more than 300° C.

3. The method according to claim 1, wherein the acetone is introduced into the article while the article is at a temperature of less than 300° C., and thereafter heating the article to a temperature of more than 300° C.

AARON K. LYLE.
DONALD E. SHARP.